United States Patent Office 3,413,239
Patented Nov. 26, 1968

3,413,239
VERMICULAR GRAPHITE STRUCTURES AND
METHOD OF MAKING
Franciszek Olstowski, Freeport, and Oliver Osborn, Lake Jackson, Tex., assignors to The Dow Chemical Company, Midland, Mich., a corporation of Delaware
No Drawing. Filed Mar. 3, 1966, Ser. No. 531,338
11 Claims. (Cl. 252—506)

ABSTRACT OF THE DISCLOSURE

This invention relates to a method for producing novel thermally conductive structures capable of wicking non-viscous liquids. Such structures are produced by blending vermicular expanded graphite having a density of less than 3 pounds per cubic foot with a quantity of wicking fibers to provide a mixture containing from about 10 to about 80 weight percent graphite. The mixture is then compressed under a pressure of at least 200 p.s.i. to form a cohered thermally conductive wicking structure.

---

This invention relates to new graphite structures and to methods for preparing the same and more particularly relates to compressed vermicular graphite structures which are thermally conductive and capable of wicking non-viscous liquids.

Thermally conductive structures capable of wicking liquids are known and used for such things as heat exchanger fin stock, absorbent graphite electrodes for batteries and the like. Such structures are exemplified as those taught by U.S. Patent 3,132,989. Such structures are normally composed of a thermally conducting paper containing dendritic metal particles. There are several shortcomings to this type of composite, however, particularly where used as a wicking heat exchanger fin stock. Such structures are difficult to prepare and the dendritic metal particles must be applied by special electrodeposition process. In many heat exchange processes the metals employed fail due to corrosion and they often contaminate the contacting liquids. Those metals which are the best thermal conductors and the most corrosion resistant are inherently expensive and have a high bulk density thereby increasing the cost per square inch of cross section of the structure.

It is an object of this invention to provide improved structures having high thermal conductivity and good wicking properties. A further object is to provide structures having relatively low bulk density and which are highly resistant to corrosion. These and other objects and advantages of the present invention will become obvious from a reading of the following detailed description.

It has now been discovered that structures having high thermal conductivity and capable of wicking non-viscous liquids may be prepared by intimately admixing vermicular graphite with wicking fibers and thereafter compressing such admixture to form a cohered structure. The structure thus formed will have a relatively low density, will be substantially inert to corrosive attack and, with proper selection of the wicking fiber, will withstand extremely high temperature use. Graphite structures prepared in this manner find use as heating elements, as fin stock for heat exchangers, as absorbent graphite anodes for batteries and for other electrochemical cells.

The term "vermicular graphite" as employed herein, refers to a light-weight, worm-like, compressible form of expanded graphite which may be prepared by treating natural flake graphite with an intercalating agent such as fuming $HNO_3$, fuming $H_2SO_4$ or mixtures of concentrated $HNO_3$ and $H_2SO_4$, and heating the treated flake graphite to a temperature, e.g. above about 500° C. to cause thermal expansion thereof. The thermally expanded graphite is vermicular in form, usually has a density between about 0.002 and .05 pound per cubic foot and is easily formed by compression into cohered flexible graphite structures.

The vermicular graphite employed in the production of the structures herein should have an apparent bulk density of less than about 3 pounds per cubic foot. Higher density vermicular graphite does not produce sufficient cohesion or mechanical interlocking upon compression to provide structures having acceptable mechanical strengths.

A quantity of such vermicular graphite must be intimately admixed with a quantity of wicking fibers to produce an intimate admixture. Such mixing may be accomplished by dry blending such as by a gently tumbling action or may be accomplished by slurrying both the vermicular graphite and the wicking fibers in a water solution. Such blending is done gently so as to avoid any excessive shearing or disintegration of the vermicular graphite particles. If blending is accomplished by water slurrying, the water must be substantially removed and the mixture dried prior to compression.

In order to provide structures having the most desirable characteristics, the final mixture should contain from about 10 weight percent to about 80 weight percent vermicular graphite and preferably from about 25 to about 75 weight percent vermicular graphite with the remainder being wicking fibers. A graphite content of less than 10 weight percent usually yields a composite having insufficient conductivity, and a composite containing greater than about 80 weight percent vermicular graphite loses its good wicking properties.

By the term "wicking fibers" is meant any organic or inorganic fiber such as paper pulp, cellulose fibers, cotton, leathers, wood excelsior or pulp, asbestos fibers, fibrous potassium titanate and the like which are wettable and therefore capable of conducting water, or other relatively non-viscous liquid, by capillary action from one place to another. By the term "non-viscous liquid" as used herein is meant a liquid which is capable of being conducted by capillary action from one place to another.

Once an intimate admixture of the vermicular graphite and the wicking fibers is prepared in the proper proportions, a compressive force of from at least 200 p.s.i. and preferably between 200 and 20,000 p.s.i. is applied thereto. The use of a compressive force of less than 200 p.s.i. produces structures having insufficient mechanical strength and pressures in excess of 20,000 p.s.i. yield no significant advantage. Such compression may be applied uniaxially, biaxially, triaxially, radially or isostatically to yield composites having a variety of thermal and electrical conductivity characteristics. Uniaxial compression will produce the structure which is highly anisotropic with the axis of greatest thermal and electrical conductivity being the axis perpendicular to that of compression. Biaxial compression reduces the anisotropy ratio between the axis of compression and the axis perpendicular to that of compression while triaxial or isostatic compression yield a structure having little or no anisotropy. In most cases, however, the structure produced is sufficiently conductive even in the direction of lowest conductivity. The electrical and thermal conductivity characteristics of these graphite compacts vary simultaneously and in the same manner i.e. a compact having a relatively high electrical conductivity will also have a relatively high thermal conductivity.

By applying the compressive force in one or more directions, various shapes and configurations may be prepared. The admixture may be rolled into flexible thin foils or sheets or pressed into hollow members such as tubes or shaped into blocks, spheres, rods and other desired shapes. The structures produced in this manner are not only thermally and electrically conductive but show wicking characteristics when in contact with any non-viscous liquid medium. Due to the relatively inert nature of such compressed composites they may be used in the presence of water or aqueous solutions, organic materials such as organic acids and chlorinated hydrocarbons or inorganic materials such as the inorganic acids. The wicking action of such composites may tend to cause a slight swelling of the structure but the swelling is not sufficient to cause disintegration or substantial weakening of its physical strength.

The following examples are provided to further illustrate the invention but are not to be construed as limiting to the scope thereof.

Example 1

Equal weights of vermicular graphite having a bulk density of about 0.5 pound per cubic foot and particulated dry paper pulp were mechanically blended by gently tumbling. The blended mixture was then placed in a mold and uniaxially compressed under a pressure of 14,000 p.s.i. The product produced was a well cohered composite slab having the following properties:

| | |
|---|---|
| Density _____ grams/cc__ | 1.44 |
| Specific resistance (in the plane perpendicular to the compression vector)__microhm inches__ | 509 |
| Specific resistance (in the plane parallel to the plane of compression)_____microhm inches__ | 17,300 |
| Tensile strength (in the plane perpendicular to that of compression axis)_____p.s.i__ | 1,380 |
| Compressive strength (in the plane parallel to that of compression)_____p.s.i__ | 7,050 |

One edge of such structure was placed in contact with water and within several minutes the entire structure was wetted with water. Contact with such water caused the structure to swell only 0.04 inch from its original thickness of 0.280.

A compressed vermicular graphite compact prepared in the same manner but containing no paper pulp did not wick water.

Example 2

A sample of 18 grams of paper pulp was dry blended with 6 grams of expanded vermicular graphite having an apparent bulk density of about 0.5 pound per cubic foot. The blended mass was compressed in a 1¼ inch by 4⅝ inch steel mold under a pressure of 17,000 p.s.i. to yield a dense composite containing 25 weight percent graphite. The specific resistance of the composite in the plane perpendicular to the compression axis was found to be 1290 microhm inches and thermal conductivity in the plane perpendicular to the compression axis was found to be 0.144 calories/second/centimeter²/centimeter/degree C. at a mean temperature of 111° C. Such structure was found to wick water in the same manner as Example 1.

Example 3

A further structure was prepared in accordance with Example 2 by intermixing 75 weight percent vermicular graphite and 25 weight percent paper pulp. Such mixture was compressed under a force of 17,000 p.s.i. to yield a compact having a density of 1.68 grams/cc. The thermal conductivity in the direction perpendicular to that of compression was found to be 0.50 calories/second/centimeter²/centimeter/degree C. at a mean temperature of 57° C. Such structure was found to wick water in the same way as the composite of Example 1.

Example 4

A mixture of vermicular graphite having a density of about 0.5 pound per cubic foot and relatively short asbestos fibers which are sold commercially to prepare filter media, was prepared by dry blending 60 parts by weight of vermicular graphite with 40 parts by weight of asbestos fibers. The mixture was uniaxially compressed under a force of 10,000 p.s.i. The cohered compact thus obtained was found to have a specific resistance (in the plane perpendicular to that of compression) of 364 microhm inches and a tensile strength of 685 p.s.i. Such composite was then cut into segments of equal lengths. One segment was found to readily wick water and the second segment readily wicked a dye-containing hydrocarbon oil having a gravity of 0.827.

Example 5

A commercial grade fibrous cellulose filter medium powder was blended with particulate natural flake graphite having mesh sizes ranging from about 20 to 60 mesh in a weight ratio of cellulose to flake graphite of 1:1. The blend was then compressed under a force of 17,000 p.s.i. to form a well cohered composite.

Another portion of the fibrous cellulose powder was blended with vermicular graphite having a density of about 0.5 pound per cubic foot and a weight ratio of 1:1. The blend was then compressed to 17,000 p.s.i. to yield a well cohered composite. The properties of the two composites are compared in the following table.

TABLE I

| | Natural flake graphite plus cellulose composite | Vermicular graphite plus cellulose composite |
|---|---|---|
| Specific resistance, microhm inches_____ | 9,160 | 425 |
| Ultimate tensile dry, p.s.i_____ | 496 | 1,250 |
| Action or immersion in water_____ | (¹) | (²) |
| Wet tensile strength, p.s.i_____ | 0 | 570 |

¹ Sample disintegrated.
² Sample wicked water.

Example 6

A mixture of wood excelsior with vermicular graphite having a bulk density of about 0.5 pound per cubic foot was prepared which contained 75 weight percent wood excelsior and 25 weight percent vermicular graphite. The mixture was compressed to yield a unitary compact having high thermal conductivity. Upon immersion of one edge of the composite thus prepared in perchloroethylene it was found that the entire structure was quickly wetted with perchloroethylene.

Various modifications can be made in the present invention without departing from the spirit or scope thereof for it is understood that we limit ourselves only as defined in the appended claims.

We claim:
1. A method for producing thermally conductive structures capable of wicking non-viscous liquids which comprises blending vermicular graphite having a density of less than about 3 pounds per cubic foot with a sufficient quantity of organic or inorganic fibers capable of conducting a liquid from one place to another by capillary action to produce an intimate admixture containing from about 10 to about 80 weight percent graphite and compressing such mixture under a compressive force of at least 200 p.s.i. to form a cohered thermally conductive wicking structure.

2. The process of claim 1 wherein the wicking fiber is paper pulp.

3. The process of claim 1 wherein the wicking fiber is asbestos.

4. The process of claim 1 wherein the wicking fiber is fibrous cellulose.

5. The process of claim 1 wherein the wicking fiber is wood excelsior.

6. The process of claim 1 wherein the compressive force is from 200 to 20,000 p.s.i.

7. A compressed vermicular graphite structure comprising an intimate admixture of from about 10 to about 80 weight percent vermicular graphite and from about 20 to about 90 weight percent of an organic or inorganic fiber capable of conducting liquid from one place to another by capillary action.

8. The process of claim 7 wherein the wicking fiber is paper pulp.

9. The structure of claim 7 wherein the wicking fiber is asbestos.

10. The structure of claim 7 wherein the wicking fiber is fibrous cellulose.

11. The structure of claim 7 wherein the wicking fiber is wood excelsior.

References Cited

UNITED STATES PATENTS

| 1,191,383 | 7/1916 | Alysworth | 23—209.1 |
| 2,993,816 | 7/1961 | Blake | 162—138 |
| 3,012,928 | 12/1961 | Whitman | 162—138 |
| 3,132,989 | 5/1964 | Stenerson | 162—181 |

LEON D. ROSDOL, *Primary Examiner.*

J. D. WELSH, *Assistant Examiner.*